No. 718,049. PATENTED JAN. 6, 1903.
C. A. DALLY.
AIR AND GAS MIXER.
APPLICATION FILED JULY 10, 1902.
NO MODEL.
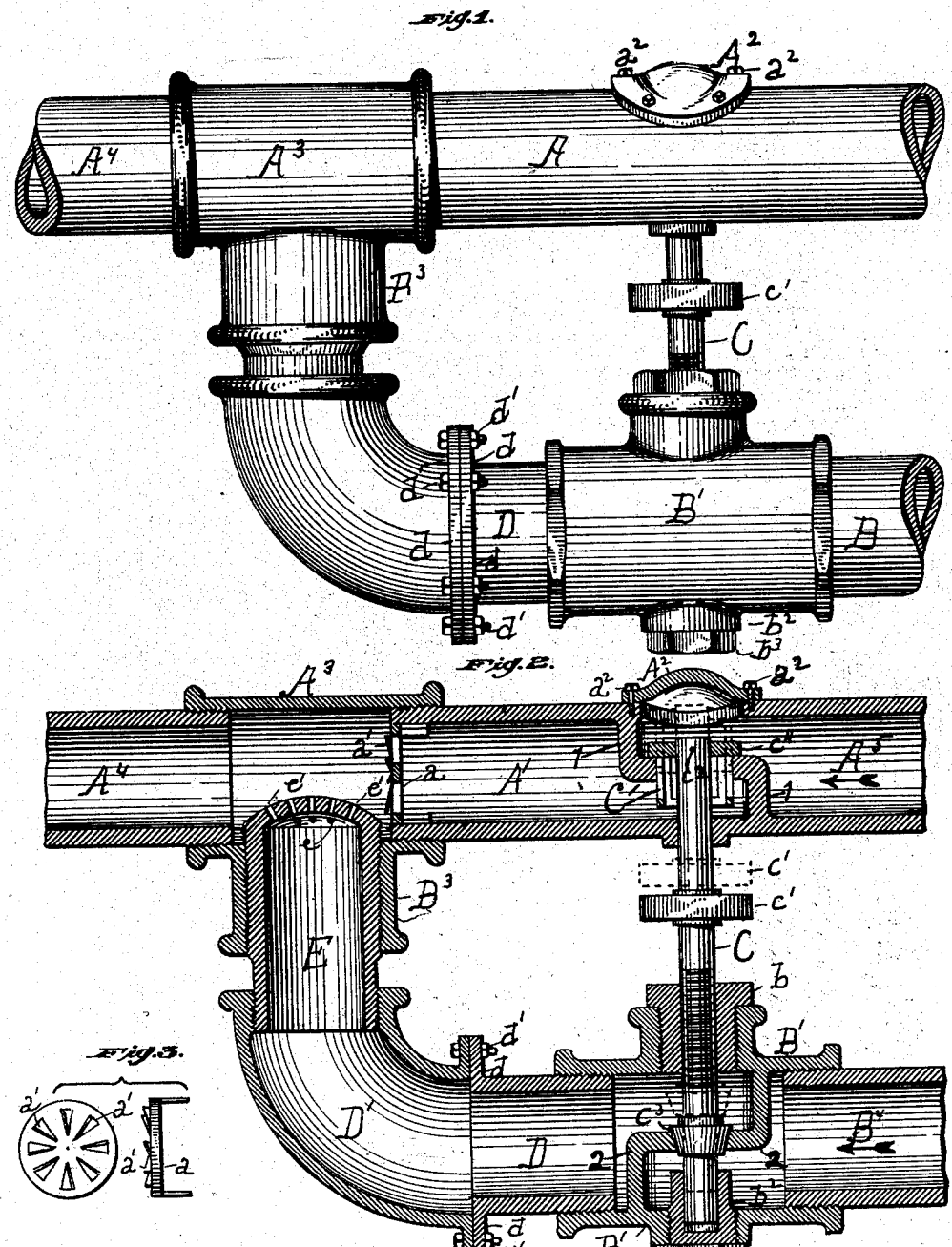

UNITED STATES PATENT OFFICE.

CHARLES A. DALLY, OF CARNOT, PENNSYLVANIA, ASSIGNOR OF ONE-HALF TO NELSON E. WHITAKER, OF WHEELING, WEST VIRGINIA.

AIR AND GAS MIXER.

SPECIFICATION forming part of Letters Patent No. 718,049, dated January 6, 1903.

Application filed July 10, 1902. Serial No. 114,994. (No model.)

*To all whom it may concern:*

Be it known that I, CHARLES A. DALLY, a citizen of the United States of America, residing at Carnot, in the county of Allegheny and State of Pennsylvania, have invented certain new and useful Improvements in Air and Gas Mixers; and I do hereby declare the following to be a full, clear, and exact description thereof, reference being had to the accompanying drawings, which form a part of this specification.

My invention relates to certain new and useful improvements in a gas and air mixer whereby air under pressure and natural or other gases are brought together in proper proportions for furnace or other purposes.

In the accompanying drawings, Figure 1 is a plan view of my air and gas mixer, and Fig. 2 is a sectional view of the same. Fig. 3 shows a front elevation of the revolving wheel seen in position in Fig. 2, and also shows a side view of the same. Fig. 4 is a side elevation of the valve-cage shown in position in Fig. 2, and also shows a top view of same.

A designates an air-pipe having two chambers $A'$ and $A^5$, with a valve-partition 1.

$a$ is a head in the chamber $A'$ at the end thereof, forming a partition. (Seen in Fig. 2.)

$A^2$ is a cap covering an opening in the pipe A. This cap is held in place by bolts $a^2$.

$A^3$ is a pipe forming a mixing-chamber and is threaded on the inside at the ends to connect with the pipes $A'$ and $A^4$. The latter pipe $A^4$ conveys the mixed air and gas to the heating-chamber.

$B'$ is a pipe forming a valve-chamber, with the valve-partition 2 therein. This pipe $B'$ has inner threads at the ends to receive pipes $B^4$ and D, the latter having outside threads at one end for said connection and at the other end a flange $d$ for bolting to the bent pipe $D'$ by bolts $d'$ $d'$.

$b$ is a threaded plug at the upper side of the pipe $B'$, and $b^2$ is a hollow plug at the lower side thereof having the nut-shaped head $b^3$. These two plugs being hollow form a guideway for the shaft C. This shaft is threaded on the part intended to operate in the threaded plug $b$. $c'$ is a wheel fixed on the shaft C to revolve the same, or a handle or gearing may be substituted for said wheel. At the upper end of this shaft is a cage-valve $C'$, having a number of outlets $c$ for the air to pass through into the chamber $A'$ from the chamber $A^5$. The cage-valve $C'$ is fixed to the shaft C by a pin $c^2$. $c^4$ is a part of the cage-valve and forms a valve-seat in the partition 1. $c^3$ is a valve fixed to the shaft C at its lower end, and its function is to regulate the flow of gas from the space below to the chambers D, $D'$, and E. These valves $c^3$ and cage $C'$ being fixed to the shaft C, their movements in opening and closing will be simultaneous, and the same may be so regulated by means of the wheel $c'$ that a fixed flow of air and gas in desired proportions, much or little, can be regulated.

The chamber E is formed as seen in Fig. 2, the outer surface at the lower end being threaded to be screwed into the bent pipe $D'$. An outer thread is cut to the pipe forming this chamber E to be screwed into the part $B^3$, the latter being threaded internally for that purpose. This chamber E has a series of perforations or outlets $e'$ $e'$ to pass the gas into the chamber formed by the pipe $A^3$. In this chamber the gas and air meet under more or less pressure, and here they are thoroughly mixed by action of the air on the gas as the two meet under a whirling motion given by the revolving wheel $a$. This wheel $a$ has a series of openings radiating from the center and cut out so as to integrally form the vanes or blades $a'$ $a'$. These blades being fixed at a proper angle with reference to and with the axis of the wheel will revolve under the air-pressure, and thus give the whirling movement to the air as it enters the mixing-chamber with the gas. When mixed with the gas, the two are forced on and into the pipe $A^4$ and from thence into the furnace or fire-box for consumption. The wheel $a$ at the end of the chamber $A'$ may be arranged either to revolve as the air is forced through the same against the blades $a'$, or it may be fixed and non-revoluble, as desired.

In operation of my gas and air mixer, the valve $c^3$ being closed to prevent the flow of gas from the pipe $B^4$ to the chamber D, the upper valve-cage $C'$ will also be closed, thus cutting off the flow of air from the chamber $A^5$ into the chamber $A'$ through the partition represented by the numeral 1. This being the condition, any upward movement of the valve $c^3$, regulated by the wheel $c'$, operates to lift the cage-valve $C'$, so that both air and gas are allowed to pass to the mixing-chamber $A^3$, as heretofore described. The opening in the pipe A over the cage-valve $C'$ is for the purpose of regulating, adjusting, fixing, &c., the various parts connected with the shaft C and valve $C'$.

Having thus fully shown and described my invention, what I claim as new, and desire to secure by Letters Patent, is—

1. In a gas and air mixer, the combination of a mixing-chamber, an air-supply pipe communicating therewith, a gas-supply pipe also communicating therewith, a valve in the air-supply pipe, a valve in the gas-supply pipe, means for operating said valves simultaneously, and a vaned wheel revolubly mounted in the mixing-chamber and operated by the air passing through the air-supply pipe, substantially as set forth.

2. In a gas and air mixer, the combination of a mixing-chamber, an air-supply pipe communicating therewith, a gas-supply pipe also communicating therewith, and a vaned wheel revolubly mounted in the mixing-chamber adjacent to the inlets for air and gas, said wheel being operated by the pressure in one of said supply-pipes, substantially as set forth.

3. In an air and gas mixer, the combination of a mixing-chamber, an air-supply pipe communicating therewith, a gas-supply pipe also communicating therewith, a valve in the air-supply pipe, a valve in the gas-supply pipe, a threaded shaft connecting said valves, a threaded bearing for the shaft and means for turning the shaft to operate said valves simultaneously, substantially as set forth.

4. In an air and gas mixer, the combination of a mixing-chamber, an air-supply pipe communicating therewith, a gas-supply pipe also communicating therewith to deliver gas in a direction transverse to the flow of air, and a vaned wheel revolubly mounted in the mixing-chamber adjacent to the gas and air inlets, said wheel being operated by the current of air flowing into the mixing-chamber, substantially as set forth.

5. In an air and gas mixer, the combination of a mixing-chamber, an air-supply pipe communicating therewith, a gas-supply pipe also communicating therewith and having a perforated cap on its discharge end, and a vaned wheel revolubly mounted on the discharge end of the air-supply pipe and operated by the current of air flowing through the air-supply pipe, substantially as set forth.

In testimony whereof I have hereunto affixed my signature in the presence of two subscribing witnesses.

CHARLES A. DALLY.

Witnesses:
H. W. STEVENSON,
HARRY H. FOWLER.